(12) United States Patent  (10) Patent No.: US 7,692,733 B2
Daiku  (45) Date of Patent: Apr. 6, 2010

(54) SURFACE LIGHT SOURCE CAPABLE OF VARYING ANGULAR RANGE FOR DIFFUSING EMITTED LIGHT AND LIQUID CRYSTAL DISPLAY APPARATUS CAPABLE OF DISPLAYING SELECTIVELY WITH WIDE VIEW ANGLE AND NARROW VIEW ANGLE BY USING SAME

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 517 days.

(21) Appl. No.: 11/511,988

(22) Filed: Aug. 29, 2006

(65) Prior Publication Data

US 2007/0046860 A1  Mar. 1, 2007

(30) Foreign Application Priority Data

Aug. 29, 2005 (JP) .............................. 2005-247727

(51) Int. Cl.
  *G02F 1/1335* (2006.01)
  *F21V 7/04* (2006.01)
(52) U.S. Cl. .............................. 349/61; 349/62; 349/68; 362/602
(58) Field of Classification Search ................. 362/601, 362/606, 607, 610, 613, 616, 623, 560, 511, 362/330, 602; 349/61, 62, 68
See application file for complete search history.

(56) References Cited

U.S. PATENT DOCUMENTS 5,079,675 A * 1/1992 Nakayama ................... 362/613

5,956,107 A * 9/1999 Hashimoto et al. ............ 349/64
6,036,329 A * 3/2000 Iimura ........................ 362/607

(Continued)

FOREIGN PATENT DOCUMENTS

CN  1614476 A  5/2005

(Continued)

OTHER PUBLICATIONS

Chinese Office Action (and English translation thereof) dated Nov. 2, 2007, issued in counterpart Chinese Patent Application.

(Continued)

*Primary Examiner*—Mike Qi
(74) *Attorney, Agent, or Firm*—Frishauf, Holtz, Goodman & Chick, P.C.

(57) ABSTRACT

A liquid crystal display apparatus comprises first and second light emitting sections for emitting light with respective spreading angles that are different from each other and a liquid crystal display device arranged at the viewing side of the apparatus. The first light emitting section includes a first light guide plate for receiving light from a light incident end surface and diffusing it within a first angular range of spreading angle centered at the normal direction of a light emitting surface before emitting it from the light emitting surface and first light emitting elements. The second light emitting section includes a second light guide plate for receiving light from a light incident end surface and emitting it in directions within a second angular range of spreading angle smaller than the first angular range while transmitting light emitted from the first light guide plate and second light emitting elements.

7 Claims, 4 Drawing Sheets

U.S. PATENT DOCUMENTS

| | | | |
|---|---|---|---|
| 6,367,957 B1 * | 4/2002 | Hering et al. | 362/511 |
| 7,195,390 B2 * | 3/2007 | Yu et al. | 362/607 |
| 7,303,322 B2 * | 12/2007 | Lamb et al. | 362/600 |
| 7,327,929 B2 * | 2/2008 | Chien et al. | 385/146 |
| 7,614,775 B2 * | 11/2009 | Iwasaki | 362/616 |
| 2002/0145860 A1 * | 10/2002 | Lee | 362/26 |
| 2003/0184990 A1 * | 10/2003 | Lin | 362/31 |

FOREIGN PATENT DOCUMENTS

| | | | |
|---|---|---|---|
| CN | 1614476 A * | 5/2005 | |
| JP | 2000-113706 A | 4/2000 | |
| JP | 2001-281459 A | 10/2001 | |
| JP | 2004-122567 A | 4/2004 | |
| JP | 2004-133334 A | 4/2004 | |
| KR | 1998-024738 A | 7/1998 | |
| KR | 2004-93593 A | 11/2004 | |
| KR | 2005-30724 A | 3/2005 | |

OTHER PUBLICATIONS

Korean Office Action dated Jan. 7, 2009 (6 pages), and English translation thereof (6 pages), issued in counterpart Korean Application No. 10-2006-0081642.

Korean Office Action dated May 13, 2009 (5 pages), and English translation thereof (4 pages), issued in counterpart Korean Application Serial No. 10-2009-0019103.

* cited by examiner ical range for diffusing emitted light and a liquid crystal display apparatus capable of displaying selectively with a wide view angle and a narrow view angle by using such a surface light source.

SURFACE LIGHT SOURCE CAPABLE OF VARYING ANGULAR RANGE FOR DIFFUSING EMITTED LIGHT AND LIQUID CRYSTAL DISPLAY APPARATUS CAPABLE OF DISPLAYING SELECTIVELY WITH WIDE VIEW ANGLE AND NARROW VIEW ANGLE BY USING SAME

BACKGROUND OF THE INVENTION

1. Field of the Invention

This invention relates to a surface light source capable of varying the angular range for diffusing emitted light and a liquid crystal display apparatus capable of displaying selectively with a wide view angle and a narrow view angle by using such a surface light source.

2. Description of the Related Art

Liquid crystal display apparatus comprises a liquid crystal display device having a screen region formed by arranging a plurality of pixels for controlling transmission of light in the form of a matrix and a surface light source arranged opposite to the viewing side of the liquid crystal display device so as to emit light substantially to all the surface of the liquid crystal display device with substantially uniform intensity. The surface light source includes a plate-shaped transparent member which is a light guide plate, at least at one of the end surfaces thereof being made to operate as light incident end surface, one of the two opposite plate surfaces thereof being made to operate as light emitting surface for emitting light as light enters from the light incident end surface, the other plate surface thereof being made to operate as light reflecting surface for reflecting light entering through the light incident end surface, and one or more than one light emitting elements for emitting light toward the light incident end surface (see, for example, Unexamined Japanese Patent Application KOKAI Publication No. 2000-113706).

Meanwhile, liquid crystal display apparatus are designed to provide a wide view angle and hence a third party can peep into what is being displayed there from a direction inclined relative to the front forward direction (the normal direction of the liquid crystal display device).

Therefore, there has been proposed a liquid crystal display apparatus capable of selectively displaying an image with a wide view angle and a narrow view angle for preventing a third party from peeping in so as to provide an enhanced level of security by arranging a view angle limiting liquid crystal device adapted to reduce the visibility from directions inclined relative to the front forward direction on one of the surfaces of the liquid crystal display device (see, Unexamined Japanese Patent Application KOKAI Publication No. 2004-133334).

A view angle limiting liquid crystal device is formed by arranging electrodes of a predetermined profile on the inner surfaces of a pair of oppositely disposed substrates at positions corresponding to partitioned regions and adapted to align the liquid crystal molecules of the liquid crystal layer filled in each of the partitioned regions between the pair of substrates in a sealed state so as to bring them either into an alignment state that provides a view angle inclined in a direction relative to the normal direction of the liquid crystal display device or into another alignment state that provides a view angle inclined in the direction opposite to the above inclined direction.

The proposed liquid crystal display apparatus can limit the view angle of the displayed image of the liquid crystal display device by reducing the visibility from inclined directions by applying a voltage to the electrodes of the view angle limiting liquid crystal device.

More specifically, the liquid crystal display device provides a wide view angle for the image being displayed when no voltage is applied to the electrodes of the view angle limiting liquid crystal device and hence the view angle limiting liquid crystal device is not operating for displaying an image. On the other hand, when a predetermined voltage is applied to the electrodes of the view angle limiting liquid crystal device, the image being displayed is concealed from side viewers trying to view the image from inclined angles relative to the front forward direction by the partitioned regions of the view angle limiting liquid crystal device where the view angle is inclined in a direction and the partitioned regions of the view angle limiting liquid crystal device where the view angle is inclined in the opposite direction. Thus, the image being displayed cannot be recognized from the view angle which is inclined in a direction and the view angle which is inclined in the opposite direction, and the view angle of the image being displayed is seemingly limited to consequently narrow the view angle of the displayed image.

However, the view angle limiting liquid crystal device has a plurality of partitioned regions produced by dividing the region of the device that corresponds to the display screen of the liquid crystal display device and the liquid crystal molecules of each of the partitioned regions are brought into an alignment state that may be different from the alignment state of other partitioned regions. In other words, the inner surfaces of the pair of substrates have to be subjected to a complex aligning process (rubbing on aligning films) of differentiating the alignment of each of the partitioned regions from that of other partitioned regions. Thus, manufacturing such a liquid crystal device is difficult.

SUMMARY OF THE INVENTION

In view of the above-identified circumstances, it is therefore a first object of the present invention to provide a surface light source capable of varying the angular range for diffusing emitted light.

The second object of the present invention is to provide a liquid crystal display apparatus capable of displaying selectively with a wide view angle and a narrow view angle by using such a surface light source capable of varying the angular range for diffusing emitted light.

In a first aspect of the present invention, the above-cited first object of the invention is achieved by providing a surface light source comprising:

a first light emitting section including a first plate-shaped transparent member and adapted to emit diffused light obtained by diffusing light entering from at least an end surface of the first plate-shaped transparent member within a predetermined first angular range from a surface of the first plate-shaped transparent member; and a second light emitting section including a second plate-shaped transparent member arranged at the side of the light emitting surface of the first light emitting section for receiving light emitted from at least an end surface of the second plate-shaped transparent member and emitting directional light diffused within a second angular range smaller than the fist angular range from a surface of the second plate-shaped transparent member and transmitting diffused light emitted from the first light emitting section.

Thus, by selectively operating the first light emitting section or the second light emitting section, a surface light source according to the present invention can selectively emit first rays of light emitted from the first light emitting section within a large angular range or second light emitted from the second light emitting section within a predetermined small angular range centered at the normal direction of the light emitting surface of the second light emitting section.

In a surface light source according to the present invention, preferably the first light emitting section includes a first light guide plate serving as the first plate-shaped transparent member and having at least a light incident end surface for receiving light through thereof, a light emitting surface for emitting light entering from the light incident end surface, the light emitting surface being one of the opposite surfaces of the first plate-shaped transparent member, and a light reflecting surface for reflecting light entering from the light incident end surface toward the light emitting surface, the light reflecting surface being the other one of the opposite surfaces of the first plate-shaped transparent member, and a first light emitting element arranged vis-à-vis the light incident end surface to emit light toward the light incident end surface and the second light emitting section includes a second light guide plate serving as the second plate-shaped transparent member and having at least a light incident end surface for receiving light through thereof, a light emitting surface for emitting light entering from the light incident end surface, the light emitting surface being one of the opposite surfaces of the second plate-shaped transparent member, and a total reflection surface for reflecting light entering from the light incident end surface toward the light emitting surface, the light reflecting surface being the other one of the opposite surfaces of the second plate-shaped transparent member, and a second light emitting element arranged vis-à-vis the light incident end surface to emit light toward the light incident end surface. Preferably, the first light guide plate has a light reflecting surface where a plurality of diffusing/reflecting sections are formed as so many fine grooves in order to diffuse and reflect light entering from the light incident end surface thereof. Preferably, the plurality of diffusing/reflecting sections are fine grooves formed to cross the entire width of the first light guide plate so as to run in parallel with the light incident end surface and having a rectangular cross section.

In a surface light source according to the present invention, preferably the second light guide plate has a plurality of inclined planes for internally reflecting light entering from the light incident end surface thereof toward a predetermined angular range centered at the normal direction of the light emitting surface of the second light guide plate. Then, the plurality of inclined planes are inclined with an angle of inclination substantially within an angular range of 10° to 20° centered at the normal direction of the light emitting surface of the second light guide plate.

Preferably, a surface light source according to the present invention further comprises an optical element arranged between the first light emitting section and the second light emitting section to adjust the spreading angle of light emitted from the first light emitting section. Then, preferably, the optical element includes at least a single prism sheet where a plurality of prism sections are formed. More preferably, the optical element includes a first prism sheet where a plurality of oblong prism sections are formed and arranged in a direction and a second prism sheet where a plurality of oblong prism sections are formed and arranged in the direction perpendicular to the above direction.

In the second aspect of the present invention, there is provided a liquid crystal display apparatus comprising:

a first light emitting section including a first plate-shaped transparent member and adapted to emit diffused light obtained by diffusing light entering from at least an end surface of the first plate-shaped transparent member within a predetermined first angular range from a surface of the first plate-shaped transparent member;

a second light emitting section including a second plate-shaped transparent member arranged at the side of the light emitting surface of the first light emitting section for emitting diffused light and adapted to receive light from at least an end surface of the second plate-shaped transparent member, emit directional light diffused within a second angular range smaller than the fist angular range from a surface of the second plate-shaped transparent member and transmit diffused light emitted from the first light emitting section; and a liquid crystal display device arranged at the side of the light emitting surface of second light emitting section provided with a plurality of pixels arranged in the form of a matrix to control light emitted from the second light emitting section.

Thus, since a liquid crystal display apparatus according to the present invention as defined above comprises a surface light source arranged at the rear side of a liquid crystal display device for displaying images to selectively emit diffused light with a wide angle or highly directional light with a narrow angle, it is possible to display images with a wide view angle and a narrow view angle.

In a liquid crystal display apparatus according to the present invention, preferably the first light emitting section includes a first light guide plate serving as the first plate-shaped transparent member and having at least a light incident end surface for receiving light through thereof, a light emitting surface for emitting light entering from the light incident end surface, the light emitting surface being one of the opposite surfaces of the first plate-shaped transparent member, and a light reflecting surface for reflecting light entering from the light incident end surface toward the light emitting surface, the light reflecting surface being the other one of the opposite surfaces of the first plate-shaped transparent member, and at least one first light emitting element which is a solid state light emitting element arranged vis-à-vis the light incident end surface to emit light toward the light incident end surface and the second light emitting section includes a second light guide plate serving as the second plate-shaped transparent member and having at least a light incident end surface for receiving light through thereof, a light emitting surface for emitting light entering from the light incident end surface, the light emitting surface being one of the opposite surfaces of the second plate-shaped transparent member, and a total reflection surface for reflecting light entering from the light incident end surface toward the light emitting surface, the total reflection surface being the other one of the opposite surfaces of the second plate-shaped transparent member, and at least one second light emitting element which is a solid state light emitting element arranged vis-à-vis the light incident end surface to emit light toward the light incident end surface. Preferably, the first light guide plate of the first light emitting section has a light reflecting surface where a plurality of diffusing/reflecting sections are formed as so many fine grooves in order to diffuse and reflect light entering from the light incident end surface thereof and the second light guide plate of the second light emitting section has a plurality of inclined planes for internally reflecting light entering from the light incident end surface thereof toward a predetermined angular range centered at the normal direction of the light emitting surface of the second light guide plate. Then, preferably the plurality of inclined planes are inclined with an angle of inclination defined to be substantially within an angular range of 20° to 40° centered at the normal direction of the light emitting surface of the second light guide plate in order to reflect light emitted from the second light guide plate substantially within an angular range of 10° to 20° centered at the normal direction of the light emitting surface of the second light guide plate.

Preferably, a liquid crystal display apparatus according to the present invention further comprises an optical element arranged between the first light emitting section and the second light emitting section to adjust the spreading angle of light emitted from the first light emitting section, the optical element including at least a single prism sheet where a plurality of prism sections are formed. Preferably, a liquid crystal display apparatus according to the present invention further comprises a light source driver for selectively turning on the first light emitting elements of the first light emitting section or the second light emitting elements of the second light emitting section.

In the third aspect of the present invention, there is provided a liquid crystal display apparatus comprising:

a first light guide plate formed as a first plate-shaped transparent member having at least a light incident end surface for receiving light through thereof, a light emitting surface for emitting light entering from the light incident end surface, the light emitting surface being one of the opposite surfaces of the first plate-shaped transparent member, and a light reflecting surface for reflecting light entering from the light incident end surface toward the light emitting surface, the light reflecting surface being the other one of the opposite surfaces of the first plate-shaped transparent member and adapted to emit diffused light obtained by diffusing light entering from the light incident end surface within a predetermined first angular range from the light emitting surface;

a first light emitting element arranged vis-à-vis the light incident end surface of the first light guide plate to emit light toward the light incident end surface;

a second light guide plate formed as a second plate-shaped transparent member having at least a light incident end surface for receiving light through thereof, a light emitting surface for emitting light entering from the light incident end surface, the light emitting surface being one of the opposite surfaces of the second plate-shaped transparent member, and a total reflection surface for reflecting light entering from the light incident end surface toward the light emitting surface, the total reflection surface being the other one of the opposite surfaces of the second plate-shaped transparent member and adapted to emit directional light diffused within a second angular range smaller than the first angular range from the light emitting surface, and transmit diffused light emitted from the first light guide plate so as to emit from the light emitting surface;

a second light emitting element arranged vis-à-vis the light incident end surface of the second light guide plate to emit light toward the light incident end surface;

a light source driver for selectively turning on the first light emitting elements or the second light emitting elements; and a liquid crystal display device arranged at the side of the light emitting surface of second light guide plate provided with a plurality of pixels arranged in the form of a matrix to control light emitted from the second light guide plate.

Thus, since a liquid crystal display apparatus according to the present invention as defined above comprises a surface light source arranged at the rear side of a liquid crystal display device for displaying images to selectively emit diffused light with a wide angle or highly directional light with a narrow angle, it is possible to display images with a wide view angle and a narrow view angle.

Preferably, in a liquid crystal display apparatus according to the present invention as defined above, the first light guide plate has a light reflecting surface where a plurality of diffusing/reflecting sections are formed as so many fine grooves in order to diffuse and reflect light entering from the light incident end surface thereof, the plurality of diffusing/reflecting sections being fine grooves formed along the entire width of the first light guide plate so as to run in parallel with the light incident end surface and having a rectangular cross section and the second light guide plate has a plurality of inclined planes for internally reflecting light entering from the light incident end surface thereof toward a predetermined angular range centered at the normal direction of the light emitting surface of the second light guide plate. Then, preferably the plurality of inclined planes are inclined with an angle of inclination defined to be substantially within an angular range of 20° to 40° centered at the normal direction of the light emitting surface of the second light guide plate in order to reflect light emitted from the second light guide plate substantially within an angular range of 10° to 20° centered at the normal direction of the light emitting surface of the second light guide plate.

Preferably, a liquid crystal display apparatus according to the present invention as defined above further comprises an optical element arranged between the first light guide plate and the second light guide plate to adjust the spreading angle of light diffused by the first light guide plate and emitted from the light emitting surface thereof. Then, preferably, the optical element includes a first prism sheet where a plurality of oblong prism sections are formed and arranged in one of two directions perpendicular relative to each other, or the direction running along the light emitting surface of the first light guide plate and a second prism sheet where a plurality of oblong prism sections are formed and arranged in the other direction of the two directions, the second prism sheet being arranged on one of the opposite surfaces of the first prism sheet.

BRIEF DESCRIPTION OF THE DRAWINGS

These objects and other objects and advantages of the present invention will become more apparent upon reading of the following detailed description and the accompanying drawings in which:

FIG. 5A is a graph illustrating the intensity distribution of first rays of light in the direction running in parallel with the horizontal direction of the display screen and FIG. 5B is a graph illustrating the intensity distribution of first rays of light in the direction running in parallel with the vertical direction of the display screen; FIG. 6A is a graph illustrating the intensity distribution of second rays of light in the direction running in parallel with the horizontal direction of the display screen and FIG. 6B is a graph illustrating the intensity distribution of second rays of light in the direction running in parallel with the vertical direction of the display screen.

DETAILED DESCRIPTION OF THE PREFERRED EMBODIMENT

Figure 1:
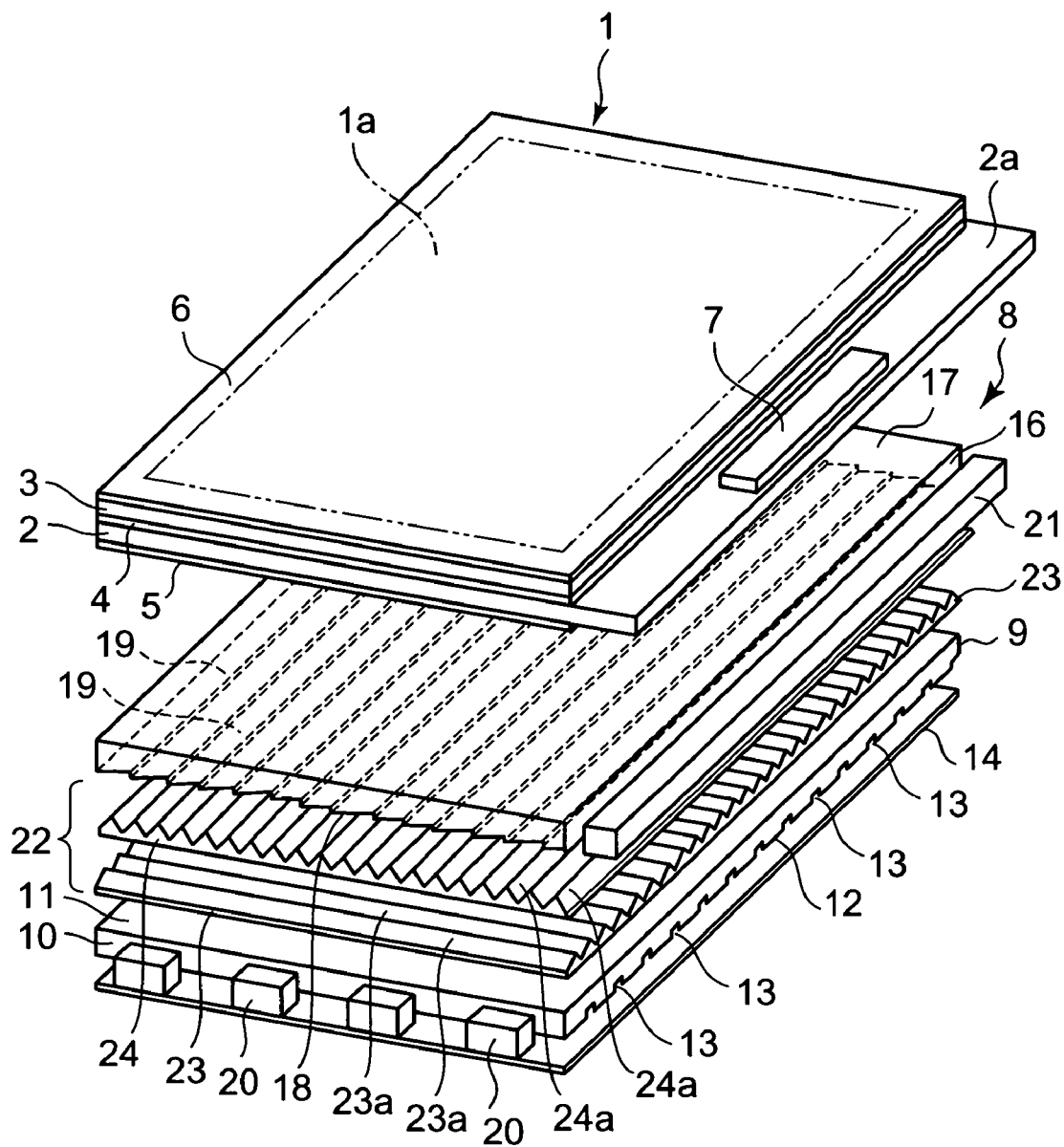
FIG. 1 is a schematic perspective view of an embodiment of liquid crystal display apparatus according to the present invention.
Figure 2:
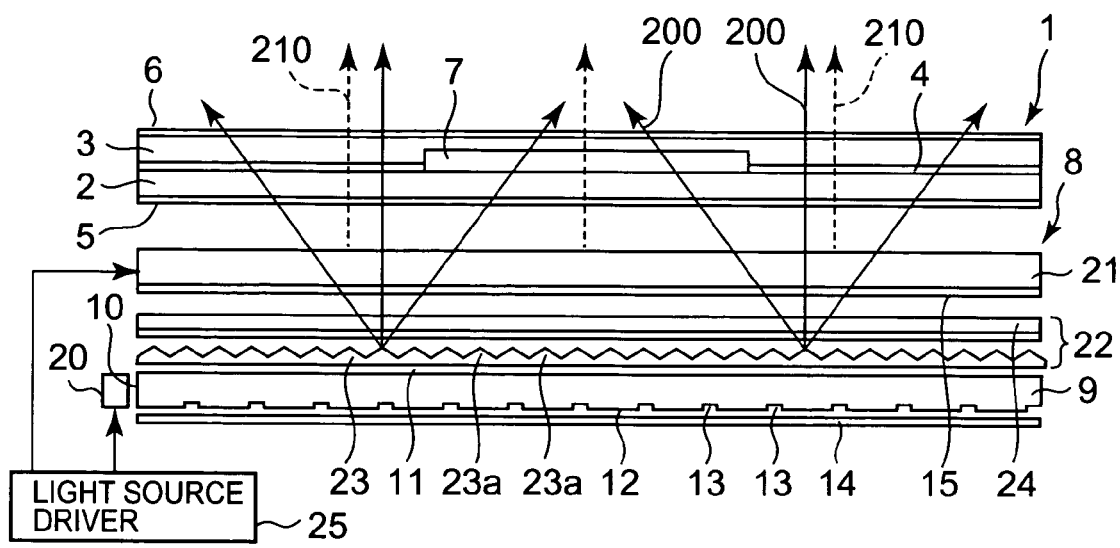
FIG. 2 is a schematic lateral view of the liquid crystal display apparatus of FIG. 1.

FIGS. 1 through 6B illustrate an embodiment of the present invention. FIGS. 1 and 2 are respectively a perspective view and a lateral view of an embodiment of liquid crystal display apparatus.

Referring to FIGS. 1 and 2, the liquid crystal display apparatus comprises a liquid crystal display device 1 having a screen region 1a where a plurality of pixels (not shown) are arranged in the form of a matrix to control transmission of light, a surface light source 8 arranged at the side of the liquid crystal display device 1 opposite to the viewing side (upper side in FIGS. 1 and 2) to selectively emit first rays of light 200 with a large spreading angle toward the liquid crystal display device 1 as indicated by arrows with solid lines in FIG. 2 or second rays of light 210 with a small spreading angle toward the liquid crystal display device 1 as indicated by arrows with broken lines in FIG. 2 and a light source driver 25 for selectively allowing first rays of light 200 or second rays of light 210 emit from the surface light source 8.

Although the internal structure of the liquid crystal display device 1 is not illustrated, the liquid crystal display device 1 includes a pair of transparent substrates 2, 3 that are bonded to each other by way of a frame-shaped sealing member 4 surrounding the screen region 1a, transparent electrodes arranged on the respective inner surfaces of the substrates 2, 3 to form a plurality of pixels arranged in the form of a matrix, a liquid crystal layer filled in the region surrounded by the sealing member 4 between the paired substrates 2, 3 and a pair of polarizing plates 5, 6 arranged on the respective outer surfaces of the paired substrates 2, 3.

Thus, the liquid crystal display device 1 is an active matrix type liquid crystal display device 1 having a plurality of pixel electrodes arranged on the inner surface of one of the substrates, or the substrate 2, along the row direction and the column direction to form a matrix and a single film-shaped opposite electrode arranged on the inner surface of the other substrate 3 so as to face the region or arrangement of the plurality of pixel electrodes. More specifically, active elements which are TFTs connected to the plurality of pixel electrodes respectively, a plurality of gate lines connected to the respective rows of the TFTs, and a plurality of data lines connected to the respective columns of the TFTs are arranged on the inner surface of the one substrate 2.

The substrate 2 has a driver mount section 2a projecting to the outside of the other substrate 3 and the plurality of gate lines and the plurality of data lines are led out to the driver mount section 2a and connected to a display driver 7 which is an LSI mounted on the driver mount section 2a.

Aligning films are arranged respectively on the inner surfaces of the paired substrates 2, 3 to cover the electrodes. The liquid crystal molecules of the liquid crystal layer are held between the paired substrates 2, 3 in an alignment state that is defined by the aligning films.

The liquid crystal display device 1 is of the TN type where the liquid crystal molecules are twisted, of the homeotropic alignment type where the liquid crystal molecules are aligned substantially vertically relative to the surfaces of the substrates 2, 3, of the homogeneous alignment type where the liquid crystal molecules are aligned substantially in parallel with the surfaces of the substrates 2, 3 without being twisted or of the bend-alignment type where the liquid crystal molecules are bend-aligned. Additionally, the liquid crystal display device 1 is either of the ferromagnetic type or of the anti-ferromagnetic type. The polarizing plates 5, 6 are arranged in such a way that their respective transmission axes provide a good contrast characteristic.

It may be needless to say that the liquid crystal display device 1 is not limited to the longitudinal electric field control type where a longitudinal electric field (an electric field directed in the direction of the height of the liquid crystal layer) is produced between the electrodes arranged respectively on the inner surfaces of the paired substrates 2, 3 to change the alignment state of the liquid crystal molecules and alternatively, it may be of the transversal electric field type where pectinate-shaped first and second electrodes are arranged on the inner surface of either of the paired substrates 2, 3 to form a plurality of pixels and a transversal electric field (an electric field directed in a direction running along the surfaces of the substrates) is produced between the electrodes to change the alignment state of the liquid crystal molecules.

Additionally, the liquid crystal display device 1 may be a normally white mode display device or a normally black mode display device.

The surface light source 8 includes a first light guide plate 9 made of a first plate-shaped transparent member, a second light guide plate 15 made of a second plate-shaped transparent member arranged at the light emitting side of the first light guide plate 9, one or more than one first light emitting elements 20 for emitting light to be entered into the first light guide plate 9 and one or more than one second light emitting elements 21 for emitting light to be entered into the second light guide plate 15. One of the end surfaces of the first light guide plate 9 is made to operate as a light incident end surface 10 for receiving light and one of the opposite surfaces of the first light guide plate 9 is made to operate as a light emitting surface 11 for emitting light coming from the light incident end surface 10 while the other surface is made to operate as a light reflecting surface 12 for reflecting light coming from the light incident end surface 10 toward the light emitting surface 11. One of the end surfaces of the second light guide plate 15 is made to operate as a light incident end surface 16 for receiving light and one of the opposite surfaces of the second light guide plate 15 located remote from the first light guide plate 9 is made to operate as a light emitting surface 17 for emitting light coming from the light incident end surface 16 while the surface of the second light guide plate 15 located vis-à-vis the first light guide plate 9 is made to operate as a total reflection surface 18 for totally and inwardly reflecting light coming from the light incident end surface 16 at the interface with the atmosphere (air) by total reflection and transmitting light emitted from the first light guide plate 9. The first light emitting elements 20 are arranged vis-à-vis the light incident end surface 10 of the first light guide plate 9 so as to emit light toward the light incident end surface 10. The second light emitting elements 21 are arranged vis-à-vis the light incident end surface 16 of the second light guide plate 15 so as to emit light toward the light incident end surface 16.

Of the first and second light guide plates 9, 15, the first light guide plate 9 is adapted to diffuse light coming from the light incident end surface 10 within a predetermined first angular range of spreading angle centered at the normal direction of the light emitting surface and emit it from the light emitting surface 11, whereas the second light guide plate 15 is adapted to emit light within a predetermined second angular range of spreading angle centered at the normal direction of the light emitting surface 17 and smaller than the first angular range and transmit light emitted from the first light guide plate 9 and coming from the total reflection surface 18 so as to emit it also from the light emitting surface 17.

Figure 3:
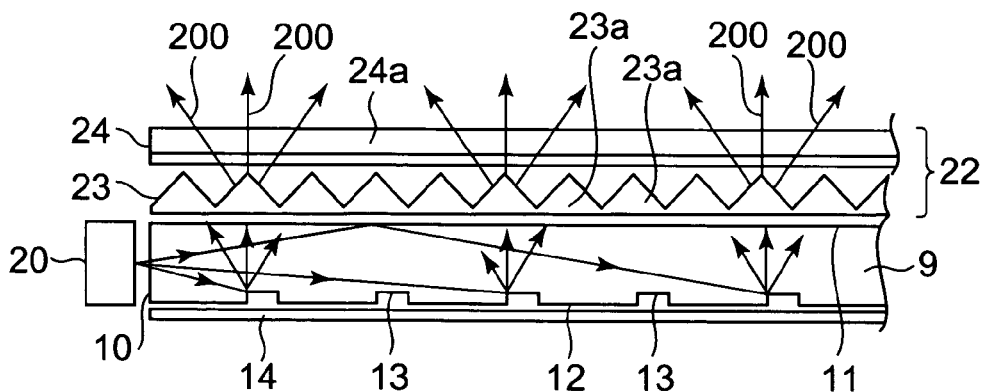
FIG. 3 is a schematic illustration of light paths of rays of light entering the first light guide plate from the light incident end surface thereof and going out from the first light guide plate of the liquid crystal display apparatus of FIG. 1.

Both the first light guide plate 9 and the second light guide plate 15 are typically made of respective acryl resin plates. As shown in FIG. 3, the light emitting surface 11 of the first light guide plate 9 is a flat surface while the light reflecting surface 12 thereof is provided with a plurality of diffusing/reflecting sections 13 formed at a predetermined pitch with intervals arranged in the proceeding direction of light entering from the light incident end surface 10 so as to diffuse and reflect light coming from the light incident end surface 10 toward the light emitting surface 11.

The plurality of diffusing/reflecting sections 13 of the reflecting surface 12 of the first light guide plate 9 are typically constructed as so many fine grooves formed to cross the entire width of the first light guide plate 9 so as to run in parallel with the light incident end surface 10 and having a rectangular cross section. Parts between the each of diffusing/reflecting sections 13 of the reflecting surface 12 are formed on the flat surface substantially parallel with the light emitting surface 11.

The reflecting surface 12 and its plurality of diffusing/reflecting sections 13 of the first light guide plate 9 are inner reflecting surfaces for totally reflecting light coming from the light incident end surface 10 at the interface with the atmosphere by total reflection. A reflector plate 14 is arranged outside the reflecting surface 12 of the light guide plate 9 to reenter light leaking from the reflecting surface 12 and its plurality of diffusing/reflecting sections 13 into the first light guide plate 9.

Figure 4:
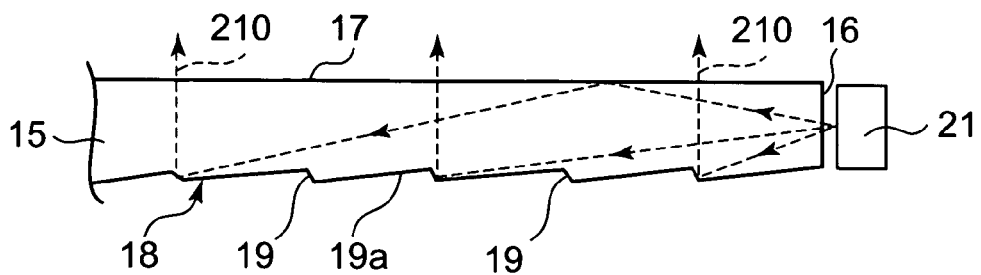
FIG. 4 is a schematic illustration of light paths of rays of light entering the second light guide plate from the light incident end surface thereof and going out from the second light guide plate of the liquid crystal display apparatus of FIG. 1.

As shown in FIG. 4, the light emitting surface 17 of the second light guide plate 15 is a flat surface while a plurality of first inclined surfaces are formed on the total reflection surface 18 at a predetermined pitch with intervals arranged in the proceeding direction of light entering from the light incident end surface 16 so as to reflect light coming from the light incident end surface 16 in directions within an angular range of spreading angle centered at the normal direction of the light emitting surface 17 of the second light guide plate 15, for example, within an angular range of spreading angle not greater than 20° to 10° relative to the normal direction.

The plurality of first inclined surfaces 19 of the total reflection surface 18 of the second light guide plate 15 are typically narrow inclined surfaces formed over the entire width of the second light guide plate 15 in the direction parallel to the longitudinal direction of the light incident end surface 16 and inclined by about 20° to 40° from the total reflection surface 18 toward the light emitting surface 17 relative to the normal line of the light emitting surface 17 in the direction opposite to the side of the light incident end surface 16. Second inclined surfaces 19a are formed between the first inclined surfaces 19. The second inclined surface 19a respectively pass the bottom edges of the first inclined surfaces 19 at the side of the light incident end surface 16 and the top edges of the first inclined surfaces 19 located at the side opposite to the side of the light incident end surface 16 and inclined by about 5° to 10° relative to the light emitting surface 17.

While the pitch of arrangement of the plurality of diffusing/reflecting sections 13 on the light reflecting surface 12 of the first light guide plate 9 and that of the plurality of total reflection surfaces 18 of the second light guide plate 15 are exaggerated in the drawings, the diffusing/reflecting surfaces 13 and the first inclined surfaces are arranged at respective pitches that are substantially equal to or smaller than the pitch of arrangement of the pixels of the liquid crystal display device 1.

The first light guide plate 9 is arranged in such a way that the light incident end surface 10 thereof is juxtaposed with an edge, e.g., the lower edge as viewed by the viewer, of the liquid crystal display device 1 while its light emitting surface 11 is disposed vis-à-vis the liquid crystal display device 1. On the other hand, the second light guide plate 15 is arranged between the light emitting side of the first light guide plate 9 and hence between the first light guide plate 9 and the liquid crystal display device 1 in such a way that the light incident end surface 16 thereof is juxtaposed with an edge, e.g., the right edge as viewed by the viewer, of the liquid crystal display device 1 while its light emitting surface 17 is disposed vis-à-vis the liquid crystal display device 1.

The first light emitting elements 20 are formed by using LEDs (light emitting diodes) or some other solid state light emitting elements. A plurality of first light emitting elements are arranged at intervals vis-à-vis the light incident end surface 10 of the first light guide plate 9 in the longitudinal direction of the light incident end surface 10.

On the other hand, the second light emitting elements 21 are formed as an array of solid state light emitting elements (e.g., LEDs) where a plurality of solid state light emitting elements are linearly arranged. They are arranged in the direction parallel to the longitudinal direction of the light incident end surface 10 and vis-à-vis the light incident end surface 16 of the second light guide plate 15.

The surface light source 8 is arranged between the first light guide plate 9 and the second light guide plate 15 and provided with an optical element 22 for adjusting the spreading angle of light diffused by the first light guide plate 9 and emitted from the light emitting surface 11 of the first light guide plate 9.

The optical element 22 includes a first prism sheet 23 made of a first transparent resin film where a plurality of oblong prism sections 23a are formed so as to extend in one of the two directions that orthogonally intersect each other on the light emitting surface 11 of the first light guide plate 9, e.g., in the direction parallel to the horizontal direction of the screen of the liquid crystal display device 1, and a second prism sheet 24 made of a second transparent resin film having a plurality of oblong prism sections 24a extending in the other one of the two directions, e.g., in the direction parallel to the vertical direction of the screen of the liquid crystal display device 1, and disposed at the side of one of the opposite surfaces of the first prism sheet 23, e.g., at the side opposite to the side facing the first light guide plate 9. The plurality of oblong prism sections 23a, 24a of the prism sheets 23, 24 are arranged at a pitch smaller than the pitch of arrangement of the plurality of diffusing/reflecting sections 13 of the light reflecting surface 12 of the first light guide plate 9.

The first prism sheet 23 is arranged in such a way that the surface thereof where the oblong prism sections 23a are formed or the flat surface thereof at the opposite side (flat surface in this embodiment) is located vis-à-vis the light emitting surface 11 of the first light guide plate 9, while the second prism sheet 24 is arranged in such a way that the surface thereof where the oblong prism sections 24a are formed or the flat surface thereof at the opposite side (flat surface in this embodiment) is located vis-à-vis the light emitting surface of the prism sheet 23 at the side of the light emitting surface (the surface opposite to the surface facing the first light guide plate 9) of the first prism sheet 23.

The light source driver 25 has a light emitting elements activating circuit for selectively turning on the first light emitting elements 20 or the second light emitting elements 21 of the surface light source 8.

Note that the liquid crystal display apparatus is typically mounted in the display section of an electronic appliance such as a portable telephone set and the light source driver 25 is adapted to turn on the first light emitting elements 20 of the surface light source 8 when a wide view angle is selected but the second light emitting elements 21 of the surface light source 8 when a narrow view angle is selected out of a wide view angle and a narrow view angle by means of a view angle selection key arranged in the electronic appliance.

The liquid crystal display apparatus may be a color image display apparatus provided with color filters of three primary colors of red, green and blue arranged on the inner surface of either of the paired substrates 2, 3 of the liquid crystal display device 1 so as to correspond to the pixels thereof or a field sequential liquid crystal display apparatus adapted to display color images without arranging color filters in the liquid crystal display device 1. In the case of a field sequential liquid crystal display apparatus adapted to display color images, solid state light emitting elements including red LEDs, green LEDs and blue LEDs may be used for the first light emitting elements 20 and the second light emitting elements 21 of the surface light source 8 so that rays of light of three colors of red, green and blue are selectively emitted from the first light emitting elements 20 or the second light emitting elements 21.

FIG. 3 is a schematic illustration of light paths of rays of light entering the first light guide plate 9 from the light incident end surface 10 thereof and going out from the first light guide plate 9. As shown in FIG. 3, rays of light entering the first light guide plate 9 from the light incident end surface 10 thereof are internally reflected by the light emitting surface 11 and the flat surface sections among the plurality of diffusing/reflecting sections 13 of the light reflecting surface 12 of the light guide plate 9 and guided in the light guide plate 9, while they are diffused and reflected by the plurality of diff-using/reflecting sections 13 as indicated by arrows in FIG. 3. Of diffused and reflected rays of light, those entering with an angle smaller than the total reflection critical angle (almost perpendicularly relative to the light emitting surface 11) are transmitted through the interface and emitted from the light emitting surface 11.

Of rays of light diffused and reflected by the plurality of diffusing/reflecting sections 13, those entering with an angle greater than the total reflection critical angle relative to the interface of the light emitting surface 11 and the atmosphere and internally reflected by the light emitting surface 11 are again internally reflected by the flat surface sections among the plurality of diffusing/reflecting sections 13 of the light reflecting surface 12 and the light emitting surface 11 and guided in the light guide plate 9 so as to be diffused and reflected further by the plurality of diffusing/reflecting sections 13 before going out from the light emitting surface 11.

More specifically, rays of light that enters the first light guide plate 9 by way of the light incident end surface 10 thereof are diffused by the first light guide plate 9 and become emitted from the light emitting surface 11 of the first light guide plate 9 with a large spreading angle.

Rays of first light (diffused light) 200 emitted from the light emitting surface 11 of the first light guide plate 9 with a large spreading angle are adjusted for the spreading angle in the direction perpendicular to the longitudinal direction of the plurality of oblong prism sections 23a of the first prism sheet 23, or in the direction parallel to the vertical direction of the screen of the liquid crystal display device 1, by the plurality of oblong prism sections 23a and then in the direction perpendicular to the longitudinal direction of the plurality of oblong prism sections 24a of the second prism sheet 24, or in the direction parallel to the horizontal direction of the screen of the liquid crystal display device 1, by the plurality of oblong prism sections 24a before they are emitted from the second prism sheet 24 toward the liquid crystal display device.

Figure 5A:
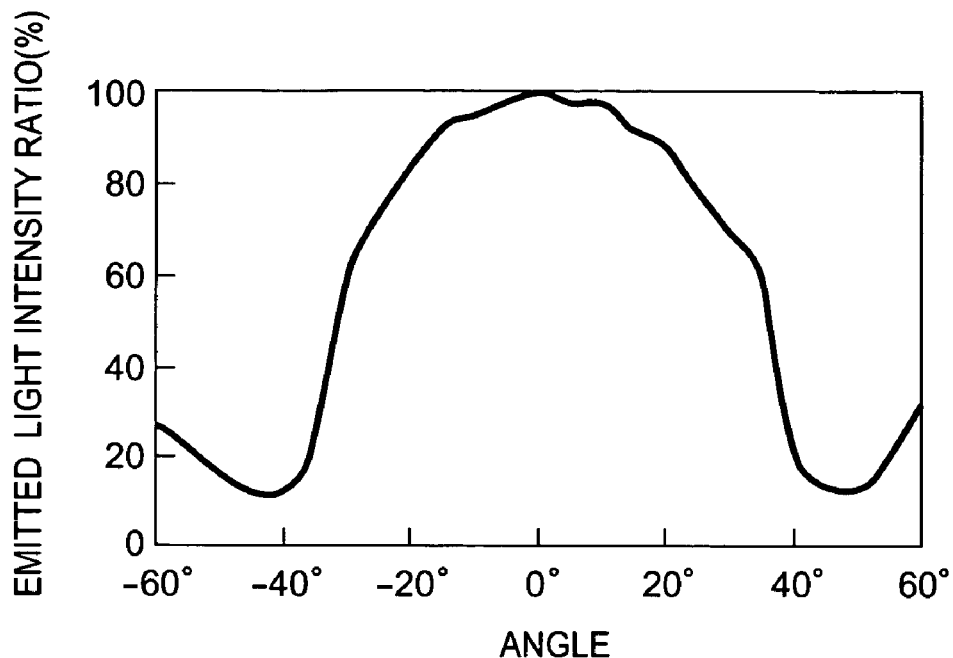
FIGS. 5A and 5B are graphs illustrating the intensity distribution of first rays of light emitted from the light emitting surface of the first light guide plate of the surface light source of FIG. 1 with a spreading angle adjusted by the optical element including a first prism sheet and a second prism sheet.
Figure 5B:
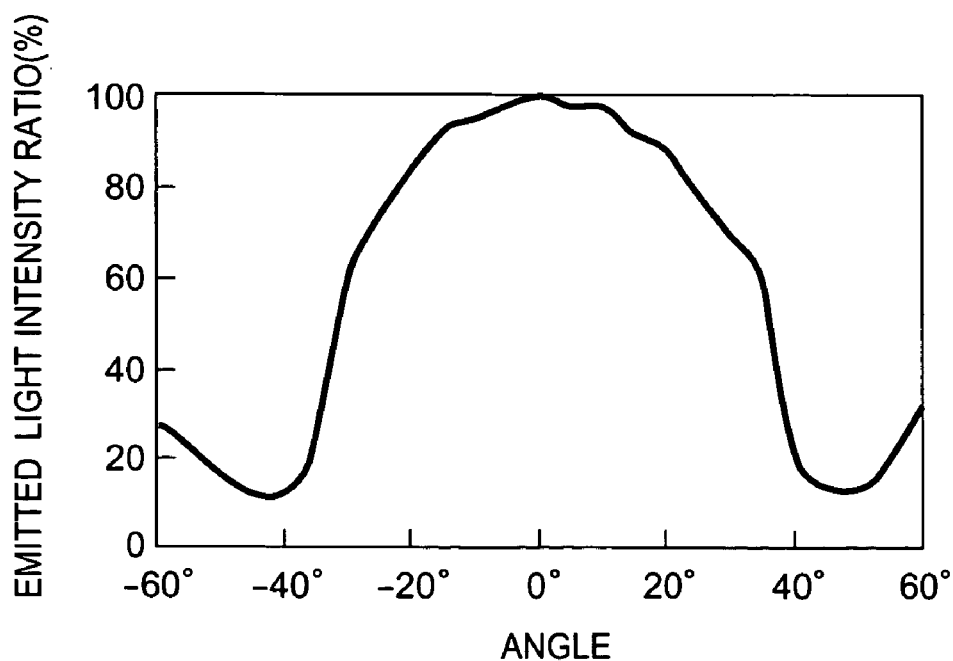

FIGS. 5A and 5B are graphs illustrating the intensity distribution of first rays of light 200 emitted from the light emitting surface 11 of the first light guide plate 9 and adjusted for the spreading angle by the optical element 22 including the first prism sheet 23 and the second prism sheet 24 and emitted from it. FIG. 5A is a graph illustrating the intensity distribution of rays of light in the direction running in parallel with the horizontal direction of the display screen of the liquid crystal display device 1 and FIG. 5B is a graph illustrating the intensity distribution of rays of light in the direction running in parallel with the vertical direction of the display screen. Note that, in FIG. 5A, the positive angle is the angle of inclination toward the right side of the display screen relative to the normal direction (direction of 0°) of the second prism sheet 24, whereas the negative angle is the angle of inclination toward the left side of the display screen relative to the normal direction of the second prism sheet 24. In FIG. 5B, the positive angle is the angle of inclination toward the top side of the display screen relative to the normal direction (direction of 0°) of the second prism sheet 24, whereas the negative angle is the angle of inclination toward the bottom side of the display screen relative to the normal direction of the second prism sheet 24.

As seen from FIGS. 5A and 5B, of first rays of light 200 emitted from the light emitting surface 11 of the first light guide plate 9 and adjusted for the spreading angle by and emitted from the optical element 22, those with intensities higher than a predetermined intensity level, for example emitted rays of light with intensity ratios of 50% and higher in both the horizontal direction and the vertical direction of the display screen of the liquid crystal display device 1, show a sufficiently wide spreading angle between 30 and 37° relative to the normal direction of the light emitting surface 11 in each of the two directions. Thus, first rays of light 200 showing a sufficiently wide spreading angle are transmitted through the second light guide plate 15 and enters the liquid crystal display device 1.

Then, since the view angle of the displayed image corresponds to the spreading angle of first rays of light 200 when first rays of light 200 are made to enter the liquid crystal display device 1, it is possible to display an image on the display screen of the liquid crystal display device 1 with a sufficiently wide view angle in both the horizontal direction and the vertical direction of the display screen and a sufficiently high viewing luminance within the view angle in each of the two directions.

Additionally, since the surface light source 8 is provided on the total reflection surface 18 of the second light guide plate 15 thereof with a plurality of first inclined surfaces adapted to reflect rays of light emitted from the first light guide plate 9 within an angular range of spreading angle centered at the normal direction of the light emitting surface 17 of the second light guide plate 15 that is smaller than the spreading angle of rays of light emitted from the first light guide plate 9, rays of light that enter the second light guide plate 15 from the light incident end surface 16 thereof are emitted to the liquid crystal display device as highly directional rays of right within a narrow angular range centered at the normal direction of the light emitting surface 17. Thus, it is possible to display an image on the display screen of the liquid crystal display device 1 with a narrow view angle and a sufficiently high viewing luminance within the view angle.

FIG. 4 is a schematic illustration of light paths of rays of light entering the second light guide plate 15 from the light incident end surface 16 thereof. Referring to FIG. 4, rays of light entering the second light guide plate 15 from the light incident end surface 16 thereof are internally reflected by the light emitting surface 17 and the inclined surface sections among the plurality of first inclined surfaces of the total reflection surface 18 and guided in the light guide plate 15, while they are reflected by the plurality of first inclined surfaces of the total reflection surface 18 within a narrow angular range of spreading angle centered at the normal direction of the light emitting surface 17 and emitted from the light emitting surface 17 as indicated by arrows with broken lines.

Figure 6A:
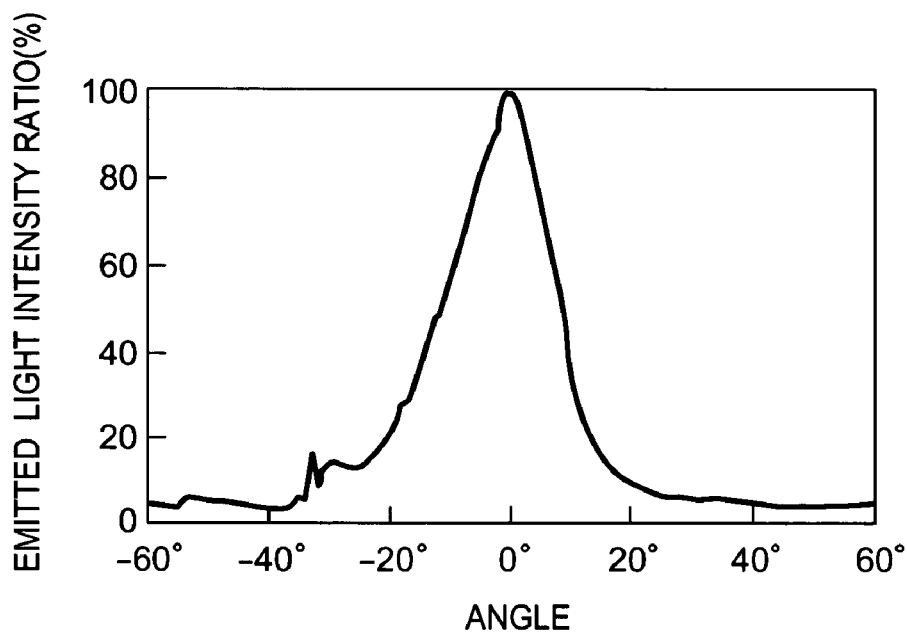
FIGS. 6A and 6B are graphs illustrating the intensity distribution of second rays of light emitted from the light emitting surface of the second light guide plate of the surface light source of FIG. 1.
Figure 6B:
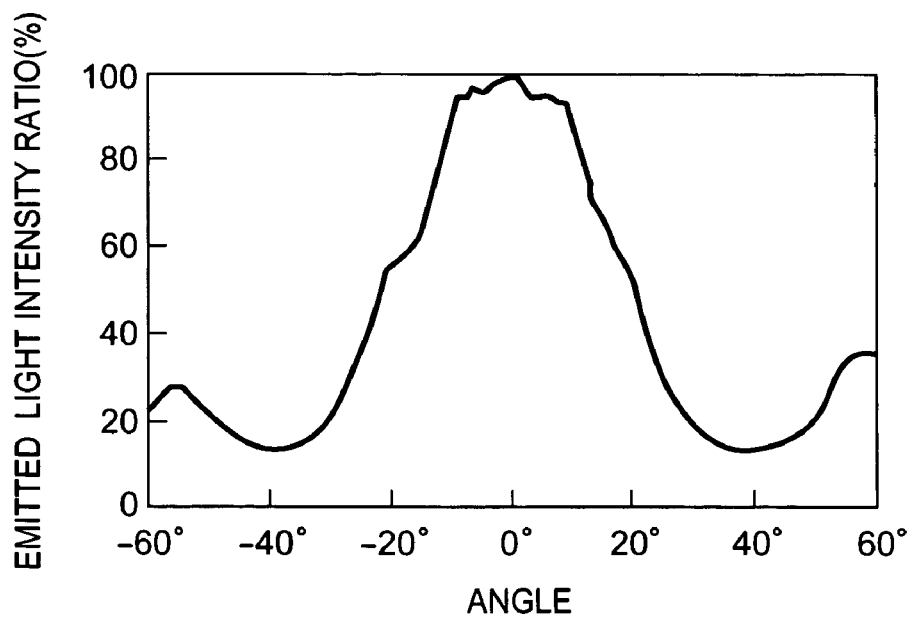

FIGS. 6A and 6B are graphs illustrating the intensity distribution of second rays of light 210 emitted from the light emitting surface 17 of the second light guide plate 15. FIG. 6A is a graph illustrating the intensity distribution of second rays of light in the direction running in parallel with the horizontal direction of the display screen of the liquid crystal display device 1 and FIG. 6B is a graph illustrating the intensity distribution of second rays of light in the direction running in parallel with the vertical direction of the display screen. Note that, in FIG. 6A, the positive angle is the angle of inclination toward the right side of the display screen relative to the normal direction (direction of 0°) of the second prism sheet 24, whereas the negative angle is the angle of inclination toward the left side of the display screen relative to the normal direction of the second prism sheet 24. In FIG. 6B, the positive angle is the angle of inclination toward the top side of the display screen relative to the normal direction (direction of 0°) of the second position 24, whereas the negative angle is the angle of inclination toward the bottom side of the display screen relative to the normal direction of the second prism sheet 24.

As seen from FIGS. 6A and 6B, of second rays of light 210 emitted from the light emitting surface 17 of the second light guide plate 15 and adjusted for the spreading angle by and emitted from the optical element 22, those with intensities higher than a predetermined intensity level, for example emitted rays of light with intensity ratios of 50% and higher in both the horizontal direction and the vertical direction of the display screen of the liquid crystal display device 1, show a sufficiently narrow spreading angle not larger than 10° relative to the normal direction of the light emitting surface 17 in the horizontal direction and not larger than 20° relative to the normal direction in the vertical direction.

Then, second rays of light 210 enter the liquid crystal display device 1. Thus, since highly directional second rays of light 210 that show a sufficiently narrow spreading angle enters the liquid crystal display device 1, it is possible to display an image on the display screen of the liquid crystal display device 1 with a sufficiently narrow view angle and a sufficiently high viewing luminance within the view angle.

In the above-described liquid crystal display apparatus, the surface light source 8 is arranged at the side opposite to the viewing side of the liquid crystal display device 1 so as to make the light emitting surface of the second light guide plate 15 face the liquid crystal display device 1. Thus, the first light emitting elements 20 or the second light emitting elements 21 of the surface light source 8 can be selectively turned on by the light source driver 25 to display an image with a wide view angle or a narrow view angle, whichever appropriate.

As described above, the surface light source 8 has a first light emitting section including the first light guide plate of the first plate-shaped transparent member and the first light emitting elements and a second light emitting section including the second light guide plate of the second plate-shaped transparent member and the second light emitting elements.

More specifically, the surface light source 8 has the first light emitting section adapted to receive light from at least one of the end surfaces of the first plate-shaped transparent member and emit diffused light from one of the opposite surfaces of the first plate-shaped transparent member that is diffused within the predetermined first angular range and the second light emitting section including the second plate-shaped transparent member arranged at the side of the surface of the first light emitting section for emitting diffused light and adapted to receive light from at least one of the end surfaces of the second plate-shaped transparent member and emit directional light diffused within the second angular range of spreading angle narrower than the first angular range from one of the opposite surfaces of the second plate-shaped transparent member but transmit diffused light emitted from the first light emitting section.

Thus, it is possible to selectively emit first rays of light 200 with a wide spreading angle from the first light emitting section or second rays of light 210 with small spreading angle in directions within a predetermined narrow angular range centered at the normal direction of the light emitting surface 17 of the second light emitting section by selectively operating the first light emitting section and the second light emitting section.

Then, since the surface light source 8 has a plurality of diffusing/reflecting sections 13 formed on the light reflecting surface 12 of the first light guide plate 9 so as to diffuse and reflect rays of light coming into the first light guide plate 9 from the light incident end surface 10 thereof toward the light emitting surface 11 of the first light guide plate 9, it is possible to diffuse and reflect rays of light coming into the first light guide plate 9 from the light incident end surface 10 thereof by means of the plurality of diffusing/reflecting sections 13 and emit them to from the light emitting surface 11 of the first light guide plate 9 in order to display an image on the liquid crystal display device 1 with a sufficiently wide view angle.

Additionally, since the surface light source 8 has an optical element 22 arranged between the first light guide plate 9 and the second light guide plate 15 for the purpose of adjusting the spreading angle of rays of light diffused by the first light guide plate 9 and emitted from the light emitting surface 11 thereof, it is possible to adjust the spreading angle of first rays of light 200 emitted from the light emitting surface 11 of the first light guide plate 9 in order to display an image on the liquid crystal display device 1 with a sufficiently wide view angle and a sufficiently high viewing luminance within the view angle.

Still additionally, since the surface light source 8 has the first prism sheet 23 including the plurality of oblong prism sections 23a running along one of the two directions that orthogonally intersect each other along the light emitting surface 11 of the first light guide plate 9 and the second prism sheet 24 including the plurality of oblong prism sections 24a running along the other of the two directions and arranged at the side of one of the two surfaces of the first prism sheet 23, it is possible to display an image on the liquid crystal display device 1 with a sufficiently wide view angle in each of the above two directions and a sufficiently high viewing laminate within the view angle in each of the above two directions.

Since the liquid crystal display apparatus comprises the surface light source 8 arranged at the rear side of the liquid crystal display device 1 for displaying images and adapted to selectively emit diffused light with a wide angle of diffusion or highly directional rays of light within a narrow angle, it is possible to display an image with a wide view angle or with a narrow view angle.

The surface light source 8 has the light emitting end surface 10 formed at one of the end surfaces of the first light guide plate 9 and the light emitting end surface 16 formed at one of the end surfaces of the second light guide plate 15 in the above-described embodiment, it may alternatively be so arranged that two light incident end surfaces 10 are formed respectively at two oppositely disposed end surfaces of the first light guide plate 9 and a plurality of diffusing/reflecting sections 13 are formed on the light reflecting surface 12 to diffuse and reflect rays of light entering the first light guide plate 9 from the two light incident end surfaces 10 toward the light emitting surface 11 of the first light guide plate 9. Additionally, it may alternatively be so arranged that two light incident end surfaces 16 are formed respectively at two oppositely disposed end surfaces of the second light guide plate 15 and a plurality of reflecting sections are formed on the total reflection surface 18 to reflect rays of light entering the second light guide plate 16 from the two light incident end surfaces 16 toward the light emitting surface 17 of the second light guide plate 15 within a predetermined angular range of spreading angle centered at the normal direction of the light emitting surface 17.

The first light guide plate 9 is not limited to the arrangement where it has a plurality of diffusing/reflecting sections 13 formed on the light reflecting surface 12 thereof to diffuse and reflect rays of light entering it from the light incident end surface 10 may have an alternative configuration so long as it is adapted to diffuse light entering from the light incident end surface 10 and emit light from the light emitting surface 11.

While the surface light source 8 of the above-described embodiment comprises the optical element 22 arranged between the first light guide plate 9 and the second light guide plate 15 for the purpose of adjusting the spreading angle of rays of light diffused by the first light guide plate 9 and emitted from the light emitting surface 11 thereof and formed by using the first prism sheet 23 and the second prism sheet 24, the optical element 22 may alternatively be formed by using only either the first prism sheet 23 or the second prism sheet 24. The optical element 22 may not necessarily be formed by using the prism sheets 23, 24 and may alternatively be formed by using a circular Fresnel lens or the like. Furthermore, the optical element 22 may be omitted.

The surface light source 8 of the above-described embodiment has the plurality of first inclined surfaces formed on the total reflection surface 18 of the second light guide plate 15 to reflect rays of light entering the second light guide plate 15 from the light incident end surface 16 thereof in directions within a predetermined angular range of spreading angle centered at the normal direction of the light emitting surface 17 of the second light guide plate 15. However, the second light guide plate 15 may be configured differently so long as it is adapted to receive light from the light incident end surface 16 and emit it from the light emitting surface 17 in directions within a predetermined angular range of spreading angle centered at the normal direction of the light emitting surface 17 and also transmit light emitted from the first light guide plate 9 and received by the total reflection surface 18 so as to emit it from the light emitting surface 17.

Finally, the surface light source 8 may find applications not only in liquid crystal display apparatus but also in other optical elements adapted to selectively use rays of light with a wide spreading angle and rays of light with a narrow spreading angle.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-247727 filed on Aug. 29, 2005 and including specification, claims, drawings and summary. The disclosure of the above Japanese Patent Application is incorporated herein by reference in its entirety.

What is claimed is:

1. A liquid crystal display apparatus comprising:
   a first light guide plate having a specified thickness between a first surface and a second surface, the first surface being formed with a plurality of first grooves running in a predetermined direction;
   a second light guide plate having a specified thickness between a third surface and a fourth surface, the third surface opposing the second surface of the first light guide plate, and the third surface being formed with a plurality of second grooves running in a direction perpendicular to the running direction of the first grooves;
   a liquid crystal display device which is provided on a side of the fourth surface of the second light guiding plate and which comprises a plurality of pixels;
   first light emitting elements which emit light toward an end surface of the first light guide plate that is parallel to the running direction of the first grooves; and
   second light emitting elements which emit light toward an end surface of the second light guide plate that is parallel to the running direction of the second grooves.

2. The liquid crystal display apparatus according to claim 1, further comprising a light source driver, which (i) sets the first light emitting elements to a non-light-emitting state in a first mode in which an image is displayed such that a view angle is narrow, and (ii) sets the first light emitting elements to a light-emitting state in a second mode in which an image is displayed such that a view angle is wide.

3. The liquid crystal display apparatus according to claim 2, wherein the light source driver sets the second light emitting elements to the light-emitting state in the first mode and sets the second light emitting elements to the non-light-emitting state in the second mode.

4. The liquid crystal display apparatus according to claim 1, wherein a screen region of the liquid crystal display device comprising the plurality of pixels is wider along the running direction of the second grooves than along the running direction of the first grooves.

5. The liquid crystal display apparatus according to claim 1, wherein a cross section of the first grooves has a shape that is different from a shape of a cross section of the second grooves.

6. The liquid crystal display apparatus according to claim 1, wherein the first light guide plate emits light from the first light emitting elements from the second surface, and the second light guide plate emits light from the second light emitting elements from the fourth surface.

7. The liquid crystal display apparatus according to claim 6, wherein the light from the second light emitting elements that has been emitted from the fourth surface has a directivity that is greater than a directivity of the light from the first light emitting elements that has been emitted from the second surface.

* * * * *